US005180769A

United States Patent [19]

Hikasa et al.

[11] Patent Number: 5,180,769

[45] Date of Patent: Jan. 19, 1993

[54] PROCESS FOR PRODUCING A THERMOPLASTIC ELASTOMER COMPOSITION

[75] Inventors: Tadashi Hikasa; Koichiro Ibuki; Tatsuo Hamanaka; Motoo Mizumori, all of Chiba, Japan

[73] Assignee: Sumitomo Chemical Company Limited, Osaka, Japan

[21] Appl. No.: 854,405

[22] Filed: Mar. 19, 1992

Related U.S. Application Data

[60] Division of Ser. No. 548,207, Jul. 5, 1990, Pat. No. 5,118,753, which is a continuation of Ser. No. 216,657, Jul. 7, 1988, abandoned.

[30] Foreign Application Priority Data

Jul. 8, 1987 [JP] Japan ............................ 62-171911

[51] Int. Cl.[5] ............................................ C08L 9/00

[52] U.S. Cl. .................................. 524/525; 524/574; 524/582; 525/198

[58] Field of Search ............... 524/525, 574; 525/198, 525/232, 387

[56] References Cited

U.S. PATENT DOCUMENTS

| | | | |
|---|---|---|---|
| Re. 30,405 | 9/1980 | Fischer | 525/240 |
| Re. 31,518 | 2/1984 | Fischer | 525/191 |
| 3,536,652 | 10/1970 | Bickel et al. | 524/484 |
| 3,758,643 | 9/1973 | Fischer | 525/191 |
| 3,806,558 | 4/1974 | Fischer | 525/198 |
| 4,130,535 | 12/1978 | Coran et al. | 524/487 |
| 4,212,787 | 7/1980 | Matsuda et al. | 525/211 |
| 4,220,579 | 10/1980 | Rinehart | 526/211 |
| 4,247,652 | 1/1981 | Matsuda et al. | 525/211 |
| 4,311,628 | 1/1982 | Abdou-Sadet et al. | 525/141 |
| 4,774,277 | 9/1988 | Janac et al. | 524/525 |
| 4,787,045 | 11/1988 | Yonekura et al. | 524/525 |

FOREIGN PATENT DOCUMENTS

| | | |
|---|---|---|
| 0052469 | 5/1982 | European Pat. Off. . |
| 0269275 | 6/1988 | European Pat. Off. . |

*Primary Examiner*—John C. Bleutge
*Assistant Examiner*—Mark Sweet
*Attorney, Agent, or Firm*—Cushman, Darby & Cushman

[57] ABSTRACT

An olefinic thermoplastic elastomer composition which is excellent in mechanical properties and is substitutable for vulcanized rubbers is provided, which comprises a mixture comprising (A) 40-95% by weight of an oil-extended olefinic copolymer rubber comprising 100 parts by weight of an olefinic copolymer rubber having a Mooney viscosity ($ML_{1+4}$ 100° C.) of 150-350 and 20-150 parts byw eight of a mineral oil and (B) 5-60% by weight of an olefinic plastic, said mixture being partially crosslinked by dynamic heat treatment in the presence of an organic peroxide. This composition gives superior molded articles free from bleeding of oil on the surface.

2 Claims, No Drawings

PROCESS FOR PRODUCING A THERMOPLASTIC ELASTOMER COMPOSITION

This is a divisional application of U.S. application Ser. No. 07/548,207 filed Jul. 5, 1990, now U.S. Pat. No. 5,118,753, which was a continuation of U.S. application Ser. No. 07/216,657 filed Jul. 7, 1988 now abandoned.

BACKGROUND OF THE INVENTION

This invention relates to an olefinic thermoplastic elastomer composition. More particularly, it relates to an olefinic thermoplastic elastomer composition superior in mechanical properties and substitutable for vulcanized rubber.

Thermoplastic elastomers (hereinafter referred to as "TPE") have been developed in their uses in a wide variety of fields such as automobile parts, household appliances and general goods because of their characteristics that they need no vulcanization and they are able to be worked by molding machines familiar to thermoplastic resins. Among them, olefinic TPE compositions are disclosed in U.S. Pat. No. 3,806,558 and the like. However, these compositions are inferior to vulcanized rubbers in flexibility, tensile strength at break, ultimate elongation and compression set and hence are limited in their uses for substitution for vulcanized rubbers.

In order to improve these properties, various attempts have been made, for example, impartation of flexibility by addition of mineral oils such as naphthenic ones or peroxide-non-curable hydrocarbon rubbers such as polyisobutylene and an improvement in compression set by increasing crosslinking degree with the use of a crosslinking assistant such as divinylbenzene (e.g., U.S. Pat. No. 4,212,787).

However, an improvement of compression set of these compositions by increasing crosslinking degree causes reduction in flexibility and tensile strength at break and ultimate elongation in tensile tests and furthermore, bleeding of a softening agent on the surface of the compositions. Thus, it has been difficult to produce olefinic TPE compositions having good balance in properties.

SUMMARY OF THE INVENTION

The object of this invention is to provide an olefinic TPE composition having low hardness i.e., 90 or less in Shore A hardness, and being excellent in flexibility and mechanical properties, especially, tensile strength at break, ultimate elongation and compression set, substitutable for vulcanized rubber and good in blow moldability, extrusion moldability or injection moldability.

As a result of the inventors' intensive research to overcome the drawbacks in the conventional methods, it has been found that a composition prepared by partially crosslinking a mixture comprising an oil-extended olefinic copolymer rubber previously containing a specific mineral oil and an olefinic plastic is superior in flexibility and mechanical characteristics. This invention is based on this finding.

DESCRIPTION OF THE INVENTION

That is, this invention relates to an olefinic TPE composition which is obtained by partially cross-linking a mixture of (A) 40–95 % by weight of an oil-extended olefinic copolymer rubber containing 20–150 parts by weight of a mineral oil per 100 parts by weight of an olefinic copolymer rubber having Mooney viscosity ($ML_{1+4}$ 100° C.) of 150–350 and (B) 5–60% by weight of an olefinic plastic.

This invention will be explained below.

(1) The olefinic copolymer rubbers used for (A) in this invention are amorphous random elastic olefinic copolymers such as ethylene-propylene copolymer rubbers, ethylene-propylene-non-conjugated diene rubbers, ethylene-butene-non-conjugated diene rubbers and propylene-butadiene copolymer rubbers. Among them, especially preferred is ethylene-propylene-non-conjugated diene rubbers (hereinafter referred to as "EPDM"). The non-conjugated dienes, include, for example, di-cyclopentadiene, 1,4-hexadiene, cyclooctadiene, methylenenorbornene and ethylidenenorbornene. Ethylidenenorbornene is especially preferred.

More specific examples are ethylene-propylene-etnylidenenorbornene (hereinafter referred to as "ENB") copolymer rubbers having 10–55% by weight, preferably 20–40% by weight of propylene and 1–30% by weight, preferably 3–20% by weight of ethylidenenorbornene and having 150–350, preferably 170–300 of Mooney viscosity ($ML_{1+4}$ 100° C.).

When propylene content is less than 10% by weight, flexibility is reduced and when more than 55% by weight, mechanical characteristics are deteriorated. When ethylidenenorbornene content is less than 1% by weight, mechanical characteristics are deteriorated and when more than 30% by weight, injection moldability decreases. When Mooney viscosity ($ML_{1+4\ 100}$° C.) is lower than 150, mechanical characteristics are degraded and when higher than 350, appearance of molded articles is damaged.

Use of EPDM having Mooney viscosity ($ML_{1+4}$ 100° C.) of 150–350 affords an improvement in mechanical characteristics, great increase in tensile strength at break and ultimate elongation and an improvement in compression set due to increase in crosslinking efficiency. EPDM may be prepared by known methods.

(2) The mineral oil used in this invention is a high boiling petroleum fraction to be added for an improvement of processability and mechanical characteristics, which includes, for example, paraffinic, naphthenic and aromatic ones. A paraffinic petroleum fraction is preferred. If an aromatic component is increased, dying property is enhanced. This is not desired, because the use for transparent articles or light color articles is limited.

(3) The oil-extended olefinic copolymer rubber (A) should contain 20–150 parts by weight, preferably 30–120 parts by weight of a mineral oil per 100 parts by weight of olefinic copolymer rubber. When an amount of the mineral oil is less than 20 parts by weight, flowability of the olefinic TPE composition decreases and especially extrusion processability and injection moldability are damaged. On the other hand, when it is more than 150 parts by weight, plasticity markedly increases, resulting in deterioration of processability and besides, properties of the product are degraded.

Mooney viscosity ($ML_{1+4\ 100}$° C.) of the oil-extended olefinic copolymer rubber (A) should be 30–150, preferably 40–100. When it is lower than 30, mechanical characteristics are damaged and when higher than 150, molding becomes difficult.

Admixture of a large amount of a mineral oil with EPDM having Mooney viscosity of 150–350 provides an olefinic TPE composition which satisfies insurance of flexibility, an improvement of processability due to increase in flowability and an improvement in mechanical characteristics.

Mineral oils are familiar as a flowability-improving agent in an olefinic TPE composition. However, according to the inventors' study, a TPE product is not satisfactory when oil-extended EPDM is not used. In other words, when oil-extended EPDM is not used, addition of a mineral oil in an amount of as large as 40 parts by weight or more per 100 parts by weight of EPDM causes bleeding of the mineral oil on the surface of the TPE composition, resulting in staining and sticking of the products, irrespective of viscosity of EPDM. On the other hand, a TPE product is obtained which is superior in properties such as tensile strength at break, ultimate elongation and compression set and has neither bleeding of a mineral oil nor staining or sticking on the surface, when an oil-extended EPDM is used, said EPDM containing 20–150 parts by weight of a mineral oil every 100 parts by weight of EPDM having 150–350 of Mooney viscosity ($ML_{1+4}$ 100° C.). The reason for no bleeding of a mineral oil on the surface in spite of a large amount of a mineral oil is considered that the use of EPDM of high Mooney viscosity brings an increase of upper limit for a permissible oil extension amount of a mineral oil and uniform dispersion of the mineral oil previously Properly added in EPDM.

Oil extension of EPDM is effected by known methods, e.g., mechanical kneading of EPDM and a mineral oil in a roll or a Banbury mixer; or adding a given amount of a mineral oil to EPDM solution, followed by desolvation, for example, by steam stripping. The latter is preferred. Easy operation is effected by using EPDM solution obtained by polymerization process.

(4) The olefinic plastic (B) used in this invention is polypropylene or a copolymer of propylene and α-olefin of 2 or more carbon atoms. The α-olefin having 2 or more carbon atoms includes, for example, ethylene, 1-butene, 1-pentene, 3-methyl-1-butene, 1-hexene, 1-decene, 3-methyl-1-pentene, 4-methyl-1-pentene and 1-octane.

Melt flow rate of these polymers should be 0.1–100 g/10 min., preferably 0.5–50 g/10 min. When melt flow rate is smaller than 0.1 g/10 min. or greater than 100 g/10 min., there occur problems in processability.

When an amount of the olefinic plastic (B) in the olefinic TPE composition of this invention is less than 5% by weight, flowability decreases, resulting in inferior appearance of molded articles and when more than 60% by weight, flexibility is reduced.

(5) Organic peroxides which perform partial crosslinking of a mixture comprising the oil-extended olefinic copolymer rubber and the olefinic plastic include, for example, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy;3,5,5-trimethylcyclohexane, 2,5-dimethyl-2,5-di(peroxybenzoyl)hexyne-3 and dicumyl peroxide. Among them, 2,5-dimethyl-2,5-di(t-butylperoxy)hexane is especially preferred in smell and scorching.

Addition amount of the organic peroxide can be selected within the range of 0.005–2.0 parts by weight, preferably 0.01–0.6 part by weight per 100 parts by weight of the oil-extended olefinic copolymer rubber and the olefinic plastic in total. When less than 0.005 part by weight, effect of crosslinking is small and when more than 2.0 parts by weight, control of reaction is difficult and further, such amount is economically disadvantageous.

(6) In production of the composition of this invention, a crosslinking assistant may be added at the time of formation of partial crosslinking with organic peroxide. Examples of the crosslinking assistant are peroxide-crosslinking promotors such as N,N'-m-phenylenebismaleimide, toluylenebismaleimide, p-quinone dioxime, nitrobenzene, diphenylguanidine and trimethylolpropane and polyfunctional vinyl monomers such as divinylbenzene, ethylene glycol dimethacrylate, polyethylene glycol dimethacrylate, trimethylolpropane trimethacrylate and allyl methacrylate. By addition of such a compound, a uniform and gentle crosslinking reaction and a reaction between the olefinic copolymer rubber and the olefinic plastic take place, whereby mechanical characteristics are improved.

Addition amounts of the peroxide-crosslinking promotor and the polyfunctional vinyl monomer can be selected within the range of 0.01–4.0 parts by weight per 100 parts by weight of the oil-extended olefinic copolymer rubber and the olefinic plastic in total. Preferred addition amount is 0.05–2.0 parts by weight. When less than 0.01 part by weight, effect is difficultly developed and when more than 4 parts by weight, this is economically not preferred.

(7) A specific process for obtaining the present TPE composition by partial crosslinking of a mixture of the oil-extended olefinic copolymer rubber and the olefinic plastic will be explained below.

Oil-extended copolymer rubber (A), olefinic plastic (B) and an organic peroxide and, if necessary, a crosslinking assistant are mixed at a specific ratio and the resulting mixture is subjected to dynamic heat treatment, namely, melting and kneading. As a mixing and kneading apparatus, known kneaders such as a non-open type Banbury mixer, a twin-screw extruder and the like can be used. Kneading may be carried out at a temperature of 150–300° C. for 1–30 minutes. If necessary, there may be further added auxiliary materials such as inorganic fillers, antioxidants, weather resisting agents, antistatic agents and colored pigments.

Preferable method for mixing and kneading the oil-extended olefinic copolymer rubber (A), olefinic plastic (B) and organic peroxide comprises sufficiently homogeneously kneading the mixture of oil-extended olefinic copolymer rubber (A) and olefinic plastic (B), if necessary, further with the crosslinking assistant and the auxiliary materials at a given ratio at 150–250° C. by a known non-open kneader such as a Banbury mixer, then sufficiently blending the resulting composition with an organic peroxide by an enclosed mixer such as a tumbler or a super-mixer and then subjecting the resulting blend to a dynamic heat treatment at 200–300 ° C. by a twin-screw continuous extruder which provides strong kneading force.

The auxiliary materials may be added at any stage during production of the present composition or at the time of processing of the composition or at use of the processed articles.

This invention will be illustrated by the following nonlimiting examples.

Test methods used in the examples and comparative examples for measurement of properties are as follows.

(1) Mooney viscosity ($ML_{1+4}$ 100° C.) (hereinafter referred to as "viscosity"): ASTM D-927-57T.

For EPDM, this was calculated by the following formula $$\log\left(\frac{ML_1}{ML_2}\right) = 0.0066\ (\Delta PHR)$$

$ML_1$: Viscosity of EPDM
$ML_2$: Viscosity of oil-extended EPDM
ΔPHR : Oil-extension amount per 100 parts by weight of EPDM (2) Hardness: ASTM D-2240 (Type A, instantaneous value)

(3) Tensile strength at break: JIS K-6301 (JIS-No. 3 dumb-bell, tensile speed 200 mm/min)

(4) Ultimate elongation: Same as for tensile strength at break.

(5) Compression set: JIS K-6301 (70° C., 22 Hr, compression rate 25%)

(6) Melt flow rate (MFR): JIS K-7210 (230° C., 2.16 kg).

(7) Blow moldability: Blow molding machine CAUTEX-NB3B of The Japan Steel Works, Ltd. was used.
Inner diameter of a mandrel: about 25 mm
Blow ratio: about 2.0, a bellows type mold.
Moldability was evaluated by uniformity of thickness and surface texture of a molded product.
Ranks for evaluation are as follows:
◯: Excellent
Δ: Good
×: Bad (8) Injection moldability: Injection molding machine FS - 75N of Nissei Plastic Industrial Co., Ltd. was used.
Molding temperature: 220° C.,
Mold temperature: 50° C.,
Injection: 10 sec., Cooling: 30 sec.,
Injection pressure: Minimum filling pressure necessary for completely filling the composition into a mold +2.5 kg/cm$^2$,
Shape of a mold: 150 mm×90 mm×2 mm pin gate.
Evaluation was based on flow mark and sink mark.
Ranks for the evaluation are as follows:
◯: Excellent
Δ: Appeared on only limited parts.
×: Appeared on the whole surface.

(9) Extrusion moldability: USV 25 mmφ extruder of Union Plastics Co., Ltd. was used.
A full flight type screw with revolving number of 30 rpm.
T-dies and profile dies were used.
Evaluation was on extrusion surface texture for T-die sheet and on reproducibility of edge portion for profile dies.
Ranks for the evaluation are as follows:
◯: Excellent
Δ: Good
×: Bad

(10) Oil bleeding: An injection molded product was left in an oven at 70° C. for 24 hours and oil bleeding on the surface of a molded product was visually evaluated.
Ranks for the evaluation are as follows:
◯: No bleeding
Δ: A slight bleeding
×: Considerable bleeding

EXAMPLE 1

200 Parts by weight of oil-extended EPDM (viscosity=53) obtained by adding to 5 wt % solution of EPDM (viscosity=242, propylene=28% by weight, iodine value=12, ENB) in hexane a mineral oil (DIANA PROCESS OIL PW-380 of Idemitsu Kosan Co.; in an amount of 100 parts by weight per 100 parts by weight of EPDM and then desolvating the mixture by steam stripping and 30 parts by weight of polypropylene (MFR=12 g/10 min) were kneaded at 170-200° C. for 7 minutes by a Banbury mixer and then a pelletized master batch was produced from the kneaded product by an extruder.

Then, 100 parts by weight of this master batch was homogeneously blended with 0.3 part by weight of 2,5-dimethyl-2,5-di(t-butylperoxy)hexane (hereinafter referred to as "organic peroxide") for 10 minutes by a Henschel mixer.

The resulting blend was subjected to dynamic heat treatment at 250° C. ±10° C. for 70 seconds by a twin-screw extruder which provides strong kneading force. Properties and moldability of the resulting pellets were evaluated.

A plate of 2 mm thick obtained by injection molding was used for measurement of hardness, tensile test and compression set.

Results of evaluation are shown in Table 1.

EXAMPLE 2

Example 1 was repeated except that 140 parts by weight of oil-extended EPDM (viscosity=93) prepared by adding to 4 wt% solution of EPDM (viscosity=170, propylene=30% by weight, iodine value=14, ENB) in hexane a mineral oil (PW - 380) in an amount of 40 parts by weight per 100 parts by weight of EPDM and then desolvating the mixture by steam stripping and 20 parts by weight of polypropylene (MFR=12 g/10 min) were used.

Results of evaluation are shown in Table 1.

EXAMPLE 3

Example 1 was repeated except that 2.5 parts by weight of N,N'-m-phenylenebismaleimide (hereinafter referred to as "BM") was added to 230 parts by weight of the oil-extended EPDM and polypropylene in total at preparation of a master batch and 0.3 part by weight of organic peroxide was added to 100 parts by weight of the master batch. The results are shown in Table 1.

EXAMPLE 4

In the same manner as in Example 1, a master batch was prepared from 170 parts by weight of oil-extended EPDM (viscosity=85) prepared by adding to 6 wt % solution of EPDM (viscosity=246, propylene=38% by weight, iodine value=10, ENB; in hexane a mineral oil (PW-380) in an amount of 70 parts by weight per 100 parts by weight of EPDM, 25 parts by weight of polypropylene (MFR=12 g/10 min) and 2 parts by weight of BM.

Subsequently, Example 1 was repeated except that 0.3 part by weight of organic peroxide was added to 100 parts by weight of the master batch. Results of evaluation are shown in Table 1.

EXAMPLE 5

Example 2 was repeated except that 2 parts by weight of BM was added to 160 parts by weight of the oil-extended EPDM and polypropylene in total at preparation of a master batch and 0.3 part by weight of organic peroxide was added to 100 parts by weight of the master batch. Results of evaluation are shown in Table 1.

EXAMPLE 6

Example 3 was repeated except that a master batch was prepared at blending ratio of 55 parts by weight of polypropylene (MFR=12 g/10 min) and 3 parts by weight of BM per 200 parts by weight of oil-extended EPDM. Results of evaluation are shown in Table 1.

EXAMPLE 7

Example 3 was repeated except that a master batch was prepared at blending ratio of 15 parts by weight of polypropylene (MFR =12 g/10 min) and 2.5 parts by weight of BM per 200 parts by weight of oil-extended EPDM. Results of evaluation are shown in Table 1.

EXAMPLE 8

Example 3 was repeated except that 0.6 part by weight of organic peroxide was used. Results of evaluation are shown in Table 1.

EXAMPLE 9

Example 3 was repeated except that 20 parts by weight of calcined kaolin (SATINETONE SPECIAL of Engelherd Industries, Ltd.) was added as an inorganic filler at preparation of a master batch and an amount of BM was changed to 3 parts by weight. Results of evaluation are shown in Table 1.

EXAMPLE 10

Example 9 was repeated except that 35 parts by weight of calcined kaolin (TRANSLINK 37 of Engelherd Industries, Ltd.) was used. Results of evaluation are shown in Table 1.

EXAMPLE 11

Example 3 was repeated except that an amount of organic peroxide was changed to 0.08 part by weight. Results of evaluation are shown in Table 1.

EXAMPLE 12

Example 3 was repeated except that an amount of BM was changed to 1.2 parts by weight and an amount of organic peroxide was changed to 0.04 part. Results of evaluation are shown in Table 1.

EXAMPLE 13

Example 3 was repeated except that oil-extended EPDM which was oil-extended by a roll controlled to 100–120° C. was used. Results of evaluation are shown in Table 1.

EXAMPLE 14

Example 5 was repeated except that oil-extended EPDM which was oil-extended by a roll controlled to 100–120° C. was used. Evaluation results are shown in Table 1.

COMPARATIVE EXAMPLE 1

Example 1 was repeated except that, in place of the oil-extended EPDM, EPDM and the mineral oil were separately used at preparation of a master batch by a Banbury mixer. Results of evaluation are shown in Table 2.

COMPARATIVE EXAMPLE 2

Example 2 was repeated except that, in place of the oil-extended EPDM, EPDM and the mineral oil were separately used at preparation of a master batch by a Banbury mixer. Results of evaluation are shown in Table 2.

COMPARATIVE EXAMPLE 3

Example 2 was repeated except that EPDM (viscosity=85, propylene=50 % by weight, iodine value=8, ENB) and the mineral oil were separately used at the same blending ratio at preparation of a master batch by a Banbury mixer. Results of evaluation are shown in Table 2.

COMPARATIVE EXAMPLE 4

Example 2 was repeated except that EPDM (viscosity=36, propylene=20 % by weight, iodine value =15, ENB) and the mineral oil were separately used at the same blending ratio at preparation of a master batch by a Banbury mixer. Results of evaluation are shown in Table 2.

COMPARATIVE EXAMPLE 5

Example 5 was repeated except that, in place of the oil-extended EPDM, EPDM and mineral oil were used separately at the preparation of a master batch by a Banbury mixer. The results are shown in Table 2.

COMPARATIVE EXAMPLE 6

Example 5 was repeated except that EPDM (viscosity=85, propylene=50 % by weight, iodine value=8, ENB) and the mineral oil were separately used at the same blending ratio at preparation of a master batch by a Banbury mixer. Results of evaluation are shown in Table 2.

COMPARATIVE EXAMPLE 7

Example 6 was repeated except that, in place of the oil-extended EPDM, EPDM and mineral oil were used separately at the same blending ratio at the preparation of a master batch by a Banbury mixer. Results of evaluation are shown in Table 2.

COMPARATIVE EXAMPLE 8

Example 7 was repeated except that, in place of the oil-extended EPDM, EPDM and mineral oil were used separately at the same blending ratio at the preparation of a master batch by a Banbury mixer. Results of evaluation are shown in Table 2.

COMPARATIVE EXAMPLE 9

Example 10 was repeated except that, in place of the oil-extended EPDM, EPDM and mineral oil were used separately at the same blending ratio at the preparation of a master batch by a Banbury mixer. Results of evaluation are shown in Table 2.

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Blending composition (Part by weight) | | | | | | | | | | | | | | | |
| Composition | Oil-extended | | | | | | | | | | | | | | |

TABLE 1-continued

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| of master batch | EPDM | | | | | | | | | | | | | | |
| | EPDM | 100 | 100 | 100 | 100 | 100 | 100 | 100 | 100 | 100 | 100 | 100 | 100 | 100 | 100 |
| | Mineral oil | 100 | 40 | 100 | 70 | 40 | 100 | 100 | 100 | 100 | 100 | 100 | 100 | 100 | 40 |
| | Polypropylene | 30 | 20 | 30 | 25 | 20 | 55 | 15 | 30 | 30 | 30 | 30 | 30 | 30 | 20 |
| | Calcined kaolin | — | — | — | — | — | — | — | — | 20 | 35 | — | — | — | — |
| | N,N'-m-phenylene-bismaleimide | — | — | 2.5 | 2 | 2 | 3 | 2.5 | 2.5 | 3 | 3 | 2.5 | 1.2 | 2.5 | 2 |
| Cross-linking composition | Master batch | 100 | 100 | 100 | 100 | 100 | 100 | 100 | 100 | 100 | 100 | 100 | 100 | 100 | 100 |
| | 2,5-dimethyl-2,5-di(t-butylperoxy) hexane | 0.6 | 0.6 | 0.3 | 0.3 | 0.3 | 0.3 | 0.3 | 0.6 | 0.3 | 0.3 | 0.08 | 0.04 | 0.3 | 0.3 |
| Properties | | | | | | | | | | | | | | | |
| Hardness | | 58 | 64 | 60 | 63 | 66 | 80 | 43 | 62 | 57 | 58 | 61 | 60 | 61 | 68 |
| Tensile test | Tensile strength at break ($kg/cm^2$) | 52 | 53 | 59 | 61 | 63 | 85 | 43 | 63 | 55 | 55 | 57 | 56 | 45 | 50 |
| | Ultimate elongation (%) | 650 | 700 | 550 | 570 | 600 | 650 | 430 | 550 | 490 | 490 | 550 | 530 | 400 | 420 |
| Compression set (%) | | 34 | 35 | 29 | 27 | 26 | 35 | 22 | 20 | 28 | 29 | 32 | 37 | 33 | 30 |
| Moldability | | | | | | | | | | | | | | | |
| Extrusion | T die | o | Δ | o | o | o | o | o | o | o | o | o | o | Δ | Δ |
| | Profile die | o | o | o | o | o | o | Δ | o | o | o | o | o | o | Δ |
| Blow | Tickness of wall | o | o | o | o | o | o | o | o | o | o | o | o | o | o |
| | Surface texture | o | Δ | o | o | o | o | o | o | o | o | o | o | o | o |
| Injection | Flow mark | o | Δ | o | o | o | o | Δ | Δ | o | o | o | o | Δ | Δ |
| | Sink mark | o | o | o | o | o | o | o | o | o | o | o | o | o | o |
| Bleeding of oil | | o | o | o | o | o | o | o | o | o | o | o | o | Δ | Δ |

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| Blending composition (Party by weight) | | | | | | | | | | |
| Composition of master batch | EPDM | 100 | 100 | 100 | 100 | 100 | 100 | 100 | 100 | 100 |
| | Mineral oil | 100 | 40 | 40 | 40 | 40 | 40 | 100 | 100 | 100 |
| | Polypropyelene | 30 | 20 | 20 | 20 | 20 | 20 | 55 | 15 | 30 |
| | Calcined kaolin | — | — | — | — | — | — | — | — | 35 |
| | N,N'-m-phenylene-bismaleimide | — | — | — | — | 2 | 2 | 3 | 2.5 | 3 |
| Cross-linking composition | Master batch | 100 | 100 | 100 | 100 | 100 | 100 | 100 | 100 | 100 |
| | 2,5-dimethyl-2,5-di(t-butylperoxy) hexane | 0.6 | 0.6 | 0.6 | 0.6 | 0.3 | 0.3 | 0.3 | 0.3 | 0.3 |
| Properties | | | | | | | | | | |
| Hardness | | Preparation of master batch was impossible | 66 | 57 | 62 | 66 | 60 | Preparation of master batch was impossible | Preparation of master batch was impossible | 57 |
| Tensile test | Tensile strength at break ($kg/cm^2$) | | 42 | 30 | 35 | 45 | 35 | | | 34 |
| | Ultimate elongation (%) | | 320 | 240 | 240 | 310 | 240 | | | 350 |
| Compression set (%) | | | 39 | 42 | 38 | 35 | 38 | | | 38 |
| Moldability | | | | | | | | | | |
| Extrusion | T die | | Δ | Δ | Δ | Δ | O | | | Δ |
| | Profile die | | Δ | Δ | o | Δ | o | | | o |
| Blow | Tickness of wall | | Molding was impossible | Molding was impossible | Molding was impossible | Δ | Δ | | | o |
| | Surface texture | | | | | Δ | Δ | | | o |
| Injection | Flow mark | | Δ | Δ | Δ | Δ | Δ | | | Δ |
| | Sink mark | | o | o | o | o | o | | | o |
| Bleeding of oil | | | Δ | Δ | Δ | Δ | Δ | | | x |

The tables show that, improvements in tensile strength at break, ultimate elongation and compression set in the region of low hardness are recognized in examples as compared with in comparative examples. Further, improvements are recognized in processability and bleeding of oil on the surface of molded articles in the examples.

According to this invention, olefinic TPE compositions are provided which are improved in processability and oil bleeding on the surface of molded articles in addition to improvements in mechanical characteristics such as tensile strength at break, ultimate elongation and which are able to be substituted for vulcanized rubbers.

Uses of the olefinic TPE composition as substitutes for vulcanized rubbers are as follows: automobile parts such as weatherstrips, headliners, interior sheets, bumper moles, side moles, air spoilers, air duct hoses and various packings; civil engineering and construction materials such as water stops, joint filler materials and window frames for construction; sports goods such as grips of golf clubs and tennis rackets; industrial parts such as hose tubes and gaskets; and household appliances such as hoses and packings.

We claim:

1. A process for producing an olefinic thermoplastic elastomer composition which comprises partially crosslinking a mixture comprising (A) 40-95% by weight of an oil-extended olefinic copolymer rubber obtained by adding 20-150 parts by weight of a mineral oil to a solution of 100 parts by weight of an olefinic copolymer rubber having Mooney viscosity ($ML_{1+4}$ 100° C.) of 170-350 and (B) 5-60% by weight of an olefinic plastic in the presence of an organic peroxide.

2. A process according to claim 1 wherein the organic peroxide is 2,5-dimethyl-2,5-di(t-butylperoxy) hexane.

* * * * *